United States Patent
Ulichney et al.

(10) Patent No.: US 9,373,032 B2
(45) Date of Patent: *Jun. 21, 2016

(54) FORENSIC VERIFICATION UTILIZING FORENSIC MARKINGS INSIDE HALFTONES

(75) Inventors: Robert Alan Ulichney, Stow, MA (US); Stephen Pollard, Dursley (GB); Matthew D Gaubatz, Seattle, WA (US); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/347,370

(22) PCT Filed: Feb. 9, 2012

(86) PCT No.: PCT/US2012/024450
§ 371 (c)(1), (2), (4) Date: Mar. 26, 2014

(87) PCT Pub. No.: WO2013/119234
PCT Pub. Date: Aug. 15, 2013

(65) Prior Publication Data
US 2014/0348376 A1  Nov. 27, 2014

(51) Int. Cl.
*G06K 9/00* (2006.01)
*H04N 1/405* (2006.01)
*H04N 1/32* (2006.01)
*G06K 9/46* (2006.01)
*G06K 15/02* (2006.01)

(52) U.S. Cl.
CPC .............. *G06K 9/00496* (2013.01); *G06K 9/46* (2013.01); *G06K 15/1881* (2013.01); *H04N 1/32144* (2013.01); *H04N 1/32256* (2013.01); *H04N 1/405* (2013.01); *H04N 2201/3235* (2013.01)

(58) Field of Classification Search
None
See application file for complete search history.

(56) References Cited

U.S. PATENT DOCUMENTS

| | | | |
|---|---|---|---|
| 6,307,955 B1 | 10/2001 | Zank et al. | |
| 7,197,644 B2 | 3/2007 | Brewington | |
| 7,394,573 B1* | 7/2008 | Goldberg et al. | 358/3.28 |
| 8,023,691 B2 | 9/2011 | Rodriguez et al. | |
| 2004/0101158 A1* | 5/2004 | Butler | 382/100 |
| 2007/0188793 A1 | 8/2007 | Wakai | |
| 2011/0016388 A1 | 1/2011 | Tang et al. | |
| 2012/0070030 A1* | 3/2012 | Ulichney et al. | 382/100 |

FOREIGN PATENT DOCUMENTS

| | | |
|---|---|---|
| CN | 102143176 A | 8/2011 |
| JP | 2004511938 | 4/2004 |
| WO | WO2005064524 A1 | 7/2005 |

OTHER PUBLICATIONS

Impedovo D et al: "Automatic Signature Verification: The State of the Art", IEEE Transactions on Systems, vol. 38, No. 5, Sep. 1, 2008, pp. 609-635.

* cited by examiner

*Primary Examiner* — Stephen R Koziol
*Assistant Examiner* — Amandeep Saini
(74) *Attorney, Agent, or Firm* — Tarolli, Sundheim, Covell & Tummino L.L.P.

(57) ABSTRACT

A forensic verification system (1100) extracts a print signature via a print signature extractor (1110) from an interior of a halftone contained in an image. The system (1100) utilizes a comparator (1120) to compare the print signature to a reference signature stored in a registry to determine differences between the print signature and the reference signature. The system (1100) utilizes a forensic analyzer (1130) to perform a forensic analysis on the signatures based on the comparison to authenticate the image.

14 Claims, 11 Drawing Sheets

FORENSIC VERIFICATION UTILIZING FORENSIC MARKINGS INSIDE HALFTONES

BACKGROUND

In environments where sensitive or confidential documents are handled, such as in financial institutions, it is often desirable to have the ability to trace who printed a document as well as when and where it was printed. For example, it may be desirable to know if a check or other financial instrument was printed from an authorized source (e.g., printer, location, and so forth) as opposed to being a fraudulent copy of the respective instrument. Electronic means such as bar coding have been applied to documents in an attempt to authenticate the legitimacy of the documents. Bar coding, for example, can unacceptably alter the appearance of the documents by embedding superfluous information such as the bar code image into the document.

DETAILED DESCRIPTION

Figure 1:
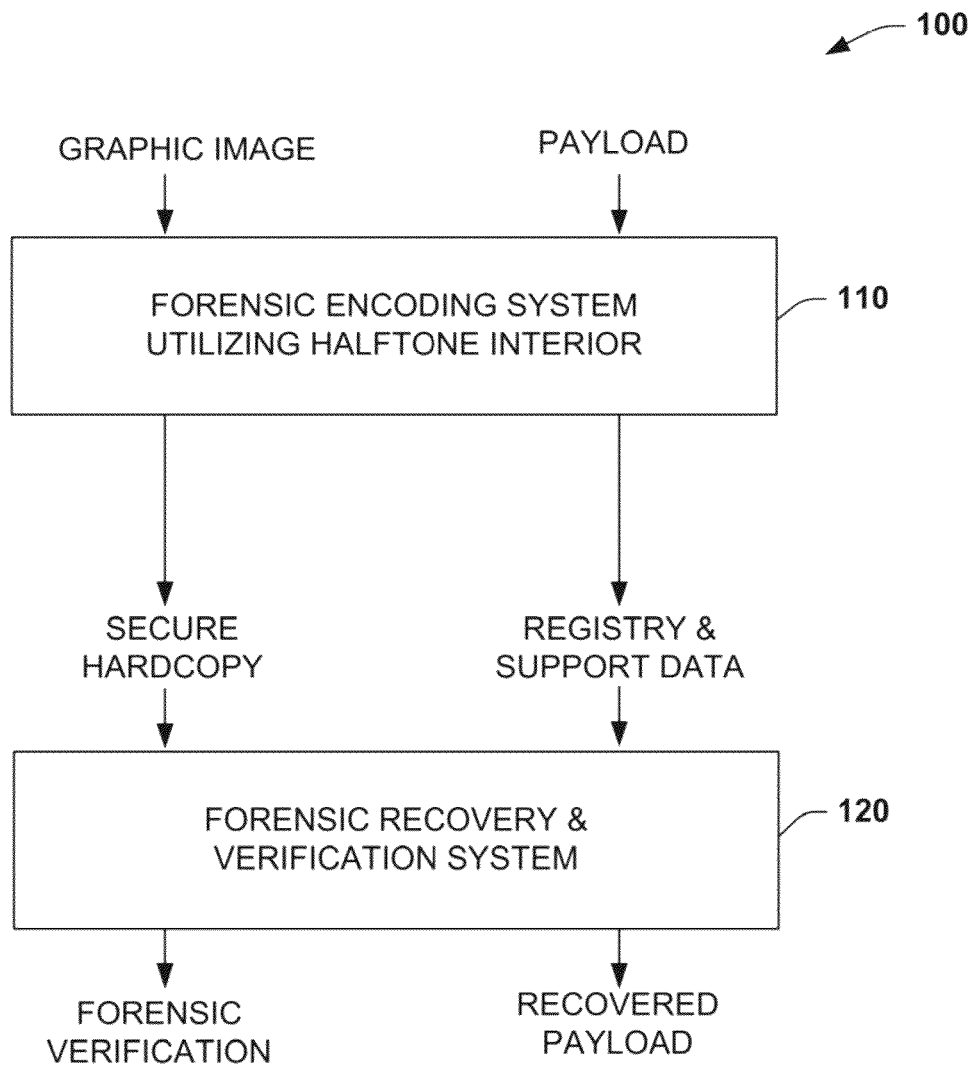
FIG. 1 illustrates an example system for performing forensic verification of printed documents utilizing forensic markings inside halftones.

FIG. 1 illustrates an example system for performing forensic verification of printed documents utilizing forensic markings inside halftones to generate and verify print signatures. The system 100 includes a forensic encoding system 110 (also referred to as the encoding system) that utilizes information inside halftones to encode forensic information. As shown, the forensic encoding system 110 receives a graphic image for encoding forensic information and payload. Output from the encoding system 110 includes a secure hardcopy and registry and support data that are employed by a forensic recovery and verification system 120 to perform forensic verification of printed documents and to recover payload data that had been previously encoded. As used herein, forensic analysis and verification provide the means to authenticate a printed document. This includes the ability to prove statistically whether or not a document was printed from an authorized source or is an unauthorized copy.

As an example of analysis and verification, electronic tickets and vouchers may be distributed from a ticket agency having an agency printer generate the tickets for their respective customers. The tickets printed from the agency printer are considered authorized and valid upon redemption. If someone were to print additional originals (electronic copies) or copy the ticket utilizing a scanner and subsequent printer, such printing would be unauthorized and fraudulent. The system 100 provides encoding and decoding of covert information placed within portions of printed documents to enable authentication. "Covert" implies that the authentication information is encoded as part of the printed image and thus undetectable by the naked eye. As can be appreciated, the authentication processes described herein can be applied to any type of printed document where it is desirable to verify that a given document corresponds to a unique physical instantiation. This functionality could also be used for applications that include but are not limited to cases where it is desirable to trace to the origins of the equipment, organization, or people, that generated the document (e.g., prove whether or not the document was generated by a particular printer, by an authorized printer, or conversely whether document was printed/copied from an unauthorized printing source).

The system 100 can also be employed to authenticate the association of two or more items, for example (e.g., a label or medallion with a serialized document on which the label/medallion is affixed). Since gray scale printing processes are inherently bi-tonal, halftoning processes can be utilized for continuous-tone graphics or images by producing the visual illusion of continuous tone though the arrangement of black and white pixels. One type of halftoning can be based on a clustered-dot technique, where gray levels are rendered with arrays of black and white clusters of pixels where the clusters are of varying size and shape. A stegatone is a halftone example that utilizes shifted dot clusters to encode information into a portion of the printed image.

As shown, the encoding system 110 can embed a payload into a halftone of a graphic image. The payload represents the data to be embedded in the halftone that can also be later employed as part of the forensic verification process (e.g., to locate a reference print signature in a registry). The encoding process includes shifting of the dot clusters within the halftone to encode the payload within the halftone. The halftone can represent any portion of a printed document. For example, this could include a graphical feature such as a circle or square or irregular shaped image object such as waves crashing on the shore, for example. Although stegatones which include a halftone pattern that holds steganographic information may be applied as part of the encoding and decoding process of the system 100, any form of halftone (e.g., with or without addition of the payload) can be utilized for the interior halftone authentication processes described herein. In one example, halftones may not change from print-to-print and in other examples each version of a halftone in each single printed page can be different. For instance, a halftone can be generated that varies only with the printing device, document author(s), user requesting the print, timestamp, security clearance, network state, or some combination of these and/or possibly other factors, for example.

The encoding system 110 creates and stores a reference signature in a registry (described below with respect to FIG. 2) that acts as a traceable fingerprint for a printed document that enables detection of authorized or unauthorized printing. The reference signature can be derived from the interior of a printed object or component within the printed document. For example, if scenic image were to have an encoded payload, the reference signature can be generated as a function of the interior dot clusters of the halftone as will be illustrated below with respect to FIG. 3. In some examples, only the halftone may be employed for the encoding and decoding processes described herein. In other examples, a unique payload may be generated for the same common graphic image and subsequently used to index the print signature in the registry (e.g., one-to-one mapping between payload and print signatures). In yet another case, the same payload may be applied to the graphic image many times and used to index the resulting print signatures in the registry (e.g., one-to-many mapping between payload and print signatures).

To authenticate a printed document, a captured image to be analyzed can be processed by the forensic recovery and verification system 120. The captured image (e.g., snapshot image of printed document) should be of sufficient resolution to enable the halftone interior analysis techniques described herein. For example, a high resolution camera or scanner (e.g., capable of acquiring an image at a resolution of 7200 dots per inch (DPI)) can be employed to capture printed media and generate the image to be analyzed. The forensic recovery and verification system 120 can generate a print signature that can be derived from the interior regions of the recovered halftone (or stegatone if a payload was encoded for the reference signature). The print signature analysis and detection will be described below with respect to FIGS. 2-9. The forensic recovery and verification system 120 compares the recovered print signature to the reference print signature stored in the registry.

An authentication event occurs by the forensic recovery and verification system 120 based on a comparison between the reference signature from the registry and the print signature derived from the captured image. This can include a statistical analysis (e.g., compare print signature interior differences to a statistical threshold, where the threshold is a designated level of statistical confidence to grant authentication). The authentication can include other analysis such as a machine learning or artificial neural network analysis where trained classifiers analyze the respective print signatures in view of the retrieved reference signatures from the registry. It is noted that the forensic analysis and verification procedures described herein can be applied to any type of printed document such as can be provided by printers or other devices such as copiers, fax machines, and multi-function print devices.

FIGS. 2-9 demonstrate some examples of forensic verification that can be implemented utilizing print signatures. Such description will be provided in terms of specific examples such a scenic image as an example halftone image, however, any portion of the image can be employed. Also, the examples include description of stegatones which are a particular category of halftones. As noted previously, the halftone itself can be employed by the halftone interior analysis techniques described herein.

For purposes of simplification of explanation, in the present example, various components of the system 100, such as the encoding system 110 and the forensic recovery and verification system 120, are illustrated and described as performing different functions. However, one of ordinary skill in the art will understand and appreciate that the functions of the described components can be performed by different components, and the functionality of several components can be combined and executed on a single component. The components can be implemented, for example, as computer executable instructions (e.g., software, firmware), hardware (e.g., a CPU, an application specific integrated circuit), or as a combination of both. In other examples, the components could be distributed among remote devices across a network, for example. The executable instructions 110 can be provided as a non-transitory computer readable medium having the computer executable instructions stored thereon.

Figure 2:
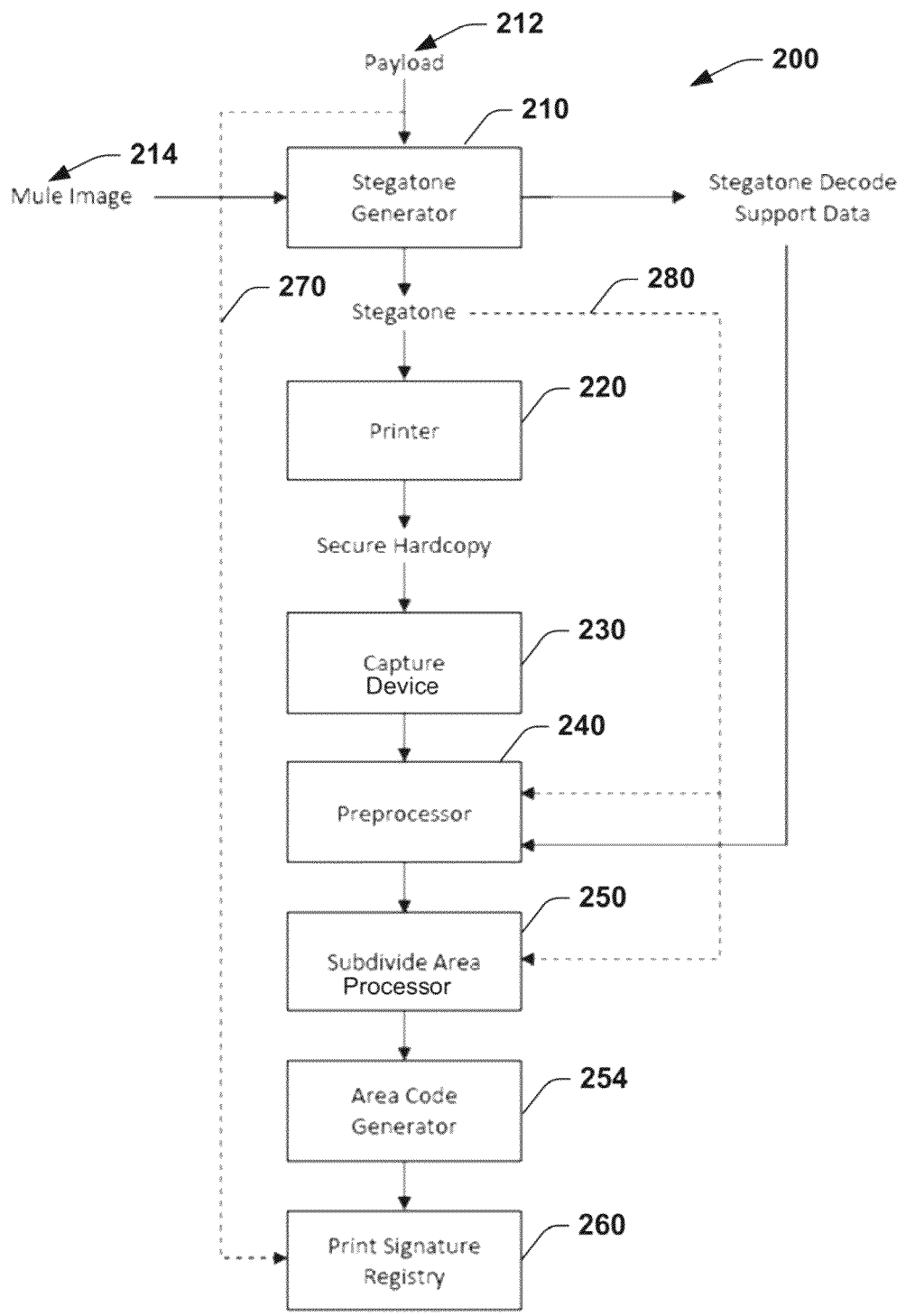
FIG. 2 illustrates an example of a forensic verification encoding system for generating reference signatures from halftone images.

FIG. 2 illustrates an example of a forensic verification encoding system 200 for generating reference signatures from halftone images. It is noted that FIG. 2 will also be described collectively with respect to FIGS. 2-8 which depict example images for encodings and example intermediate processing stages for the respective images. With respect to FIG. 2, a stegatone generator 210 receives a payload 212 and a graphic mule image 214 and generates a stegatone and stegatone decode support data. The mule image 214 is the portion of an image where data is encoded into the respective halftone. A printer 220 prints the stegatone and generates a secure hardcopy which is photographed or imaged by capture device 230. A preprocessor 240 processes an image from the capture device 230. The preprocessor 240 can operate via at least two methods including a bandpass filter depicted in FIG. 4 and a difference method depicted in FIG. 5.

Figure 6:
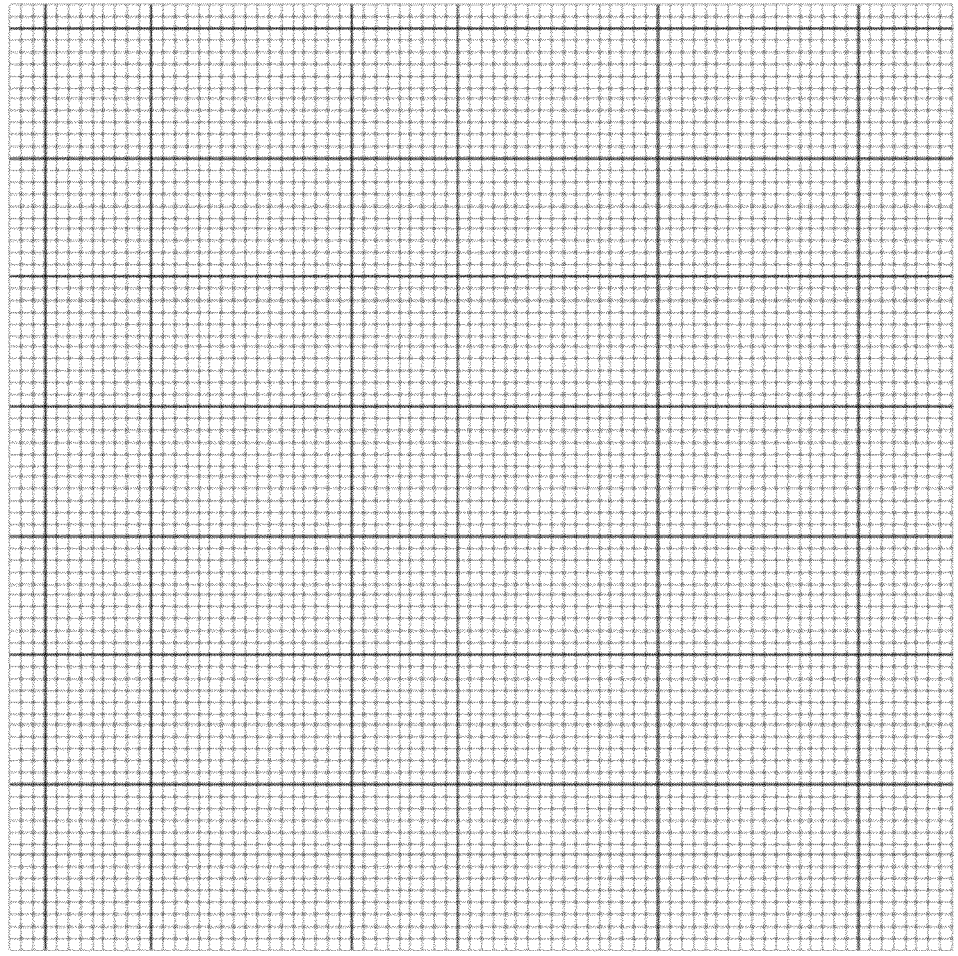
FIG. 6 illustrates an example of equi-spaced segmentation of halftones.
Figure 7:
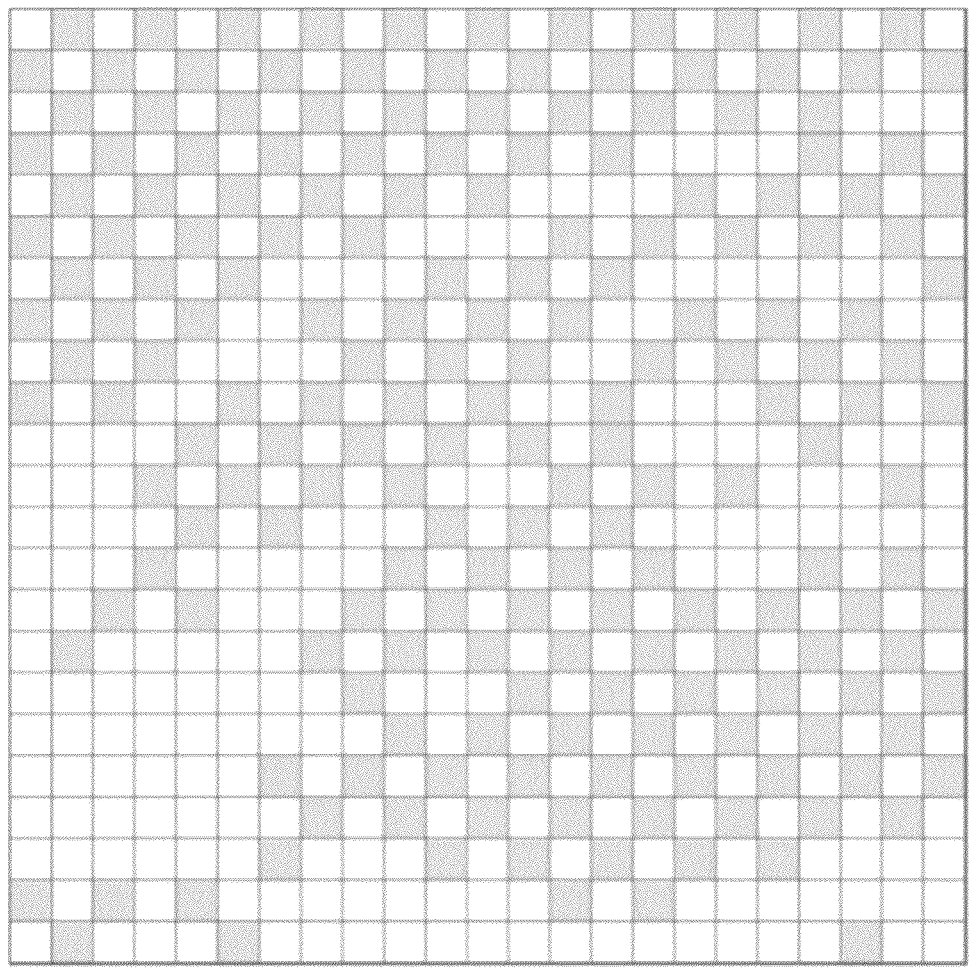
FIG. 7 illustrates an example of segmentation of halftones that are analyzed along halftone cell boundaries.
Figure 8:
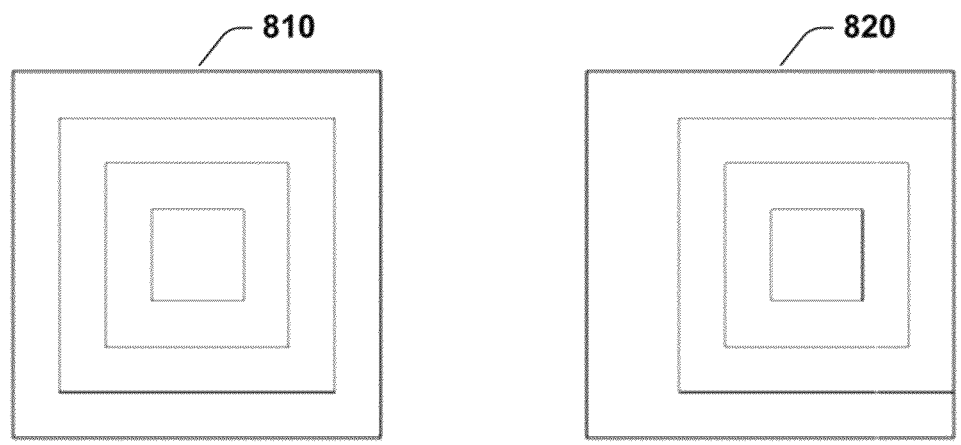
FIG. 8 illustrates an example of concentric cell and shifted concentric cell analysis for halftones.

A subdivide area processor 250 utilizes alternative subdivision methods depicted in FIGS. 6-8 for processing the pre-processed image from the preprocessor 240. An area code generator 254 performs final stage processing before a print signature of the captured image is saved in a print signature registry 260. Dashed lines 270 and 280 indicate additional processing branches, which may vary depending on the preprocessing and subdivision techniques employed. For example, line 270 may include directly storing the payload 212 in the print signature registry 260 to facilitate future forensic verification and indexing of print signatures. As another example, the line 280 demonstrates that the stegatone may be passed to the preprocessor 240 and subdivide area processor 250 before further processing by the area code generator 254.

The system 200 enables forensic signatures to be extracted from the interior of halftones (e.g., steganographic halftones) in combination with covert embedding of data payloads. One aspect of this combination is that the payload data can be used as an index to efficiently store and retrieve the forensic signature to/from the print signature registry 260. The captured hardcopy from the capture device 230 can be preprocessed in order to optimize forensic discrimination, and the interior area of the halftone can be subdivided in a number of alternative ways. Systems for both the encoder (FIG. 2) and decoder (FIG. 9) are provided.

A function of the encoding system 200 is the creation of a secure hardcopy document with an embedded payload 212 along with filing its forensic fingerprint in the registry 260. The stegatone generator 210 takes the data payload 212 and input image 214 referred to as a "mule" since it is the vehicle that transports the payload when printed. As an example, one type of input images that can be utilized (others are possible) include any type of photo-based or graphic-based images. An image example is shown at 310 of FIG. 3.

Figure 3:
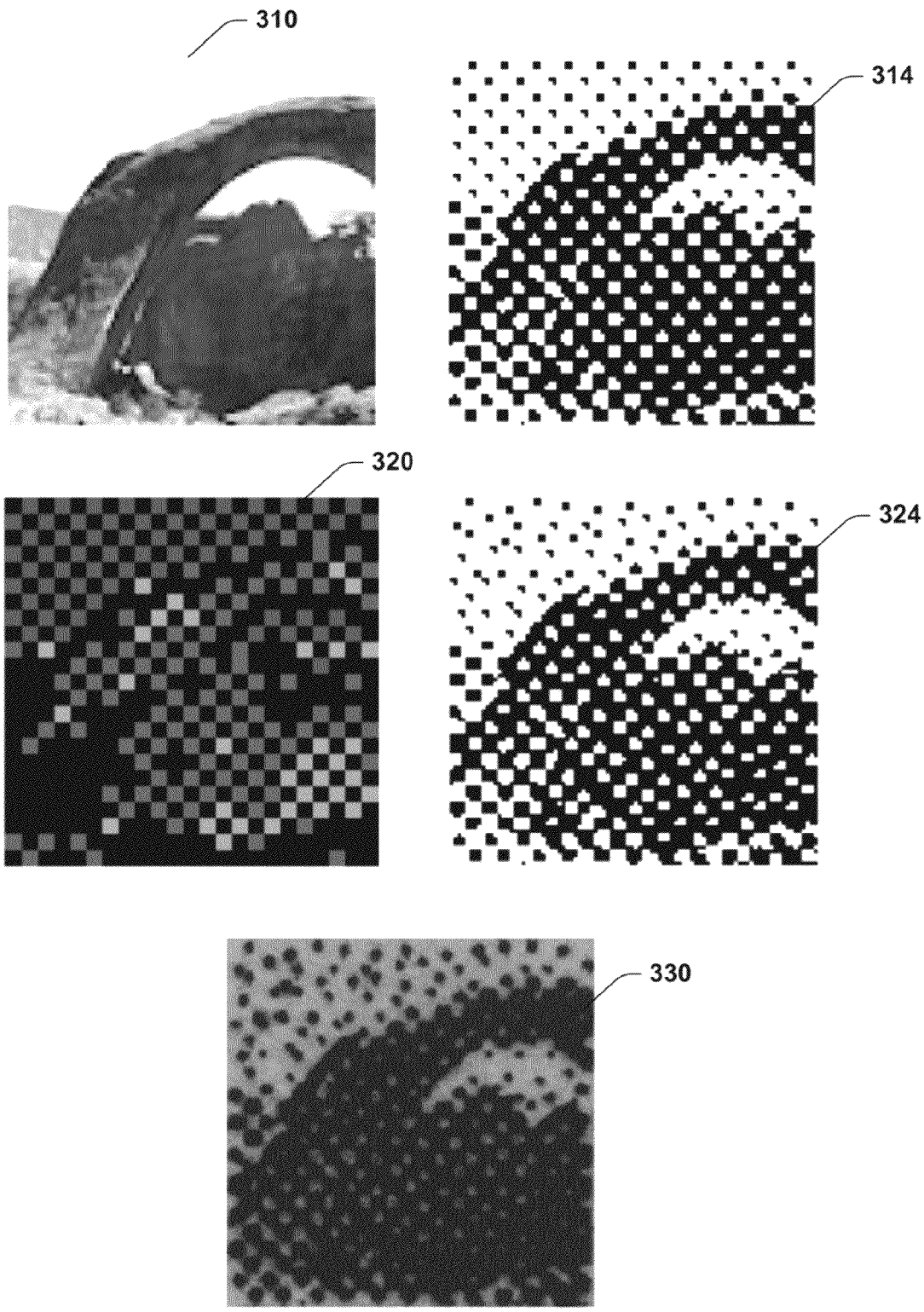
FIG. 3 illustrates an example set of images that represent halftone encodings that employ forensic markings inside halftones.

After preprocessing, a reference halftone as shown at 314 of FIG. 3 can be generated from the mule image 214. The reference halftone can be a standard clustered-dot halftone, as shown at 314. Halftone cells can be classified in a reference map such as 0-bit, 1-bit, 2-bit, or 3-bit data carriers. Examples of these cells are depicted at 320 of FIG. 3. It is noted that 0-bit carriers are referred to as reference cells since they are unchanged from the original cells and can be used for alignment. For instance, cells can be reference cells because they are too large to be shifted or too small to be detected. Cells can also be forced to be reference cells if their unaltered, shape is desired to retain edge detail or if they are needed to assist alignment. The payload 212 can be encoded by means of a single pixel shift of the halftone clusters, for example. The data carrying capacity of the image of FIG. 3 is 349 bits, for example, which is many times more than most encryption standards require such as AES, DES, FIPS, and so forth. A 349-bit payload can be encoded as the steganographic halftone or "stegatone" as shown at 324 of FIG. 3.

Along with producing the respective image, the stegatone generator 210 of FIG. 2 outputs stegatone decode support data that can be utilized for decoding the stegatone, possible regeneration of the stegatone, and/or aid in indexing print signatures from the registry 260. Stegatone decode support data can include the mule image 214, reference halftone, reference map, along with shift and selection rules for decoding. The stegatone can be passed to the printer 220 to create the secure hardcopy of the print signature.

In preparation to locating a forensic "finger print" in the interior of the halftone or stegatone in this example, the secure hardcopy can be digitized via the capture device 230 (e.g., digital camera or scanner). The capture hardware should be of sufficiently high resolution to render forensic quality detail (e.g., 7200 DPI) such as shown at 330 of FIG. 3. A unique identifying print signature can be extracted by measuring the variance within subareas of the captured stegatone or halftone. To have the most differentiating code, the captured image should be preprocessed to amplify what is unique at a microscopic scale. The preprocessor 240 of FIG. 2 can perform this task. It first should align the captured stegatone (or halftone) by making use of the stegatone decode support data.

Figure 4:
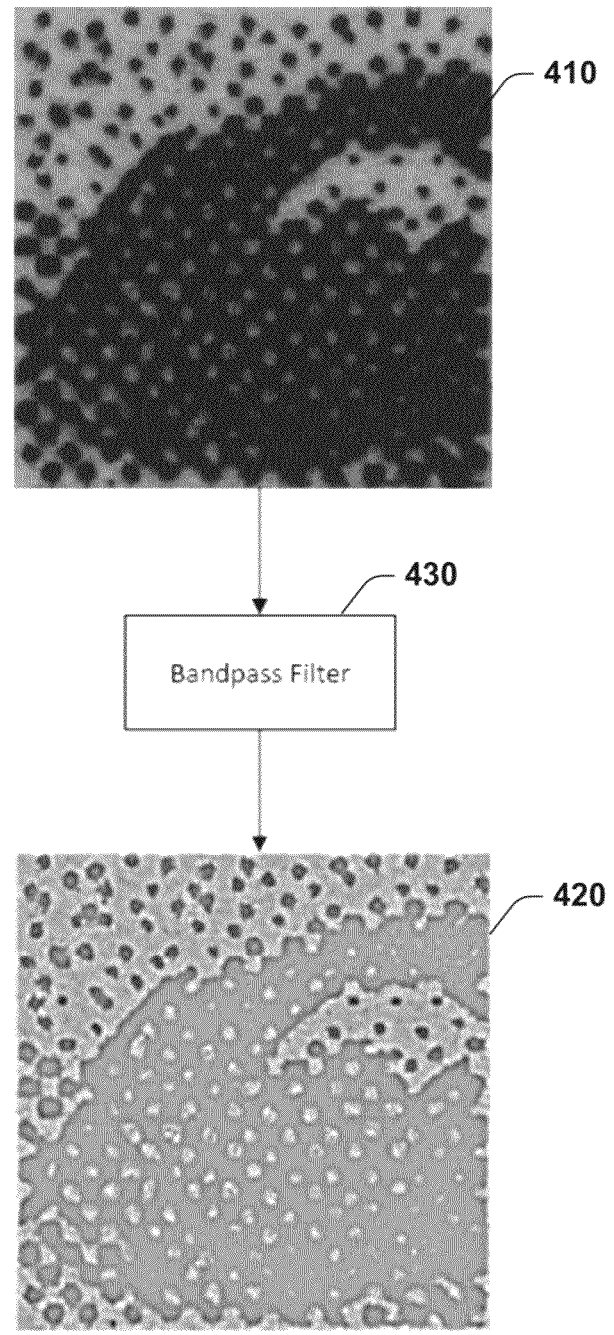
FIG. 4 illustrates an example of bandpass filtering of halftones.

One type of preprocessing is shown in FIG. 4, wherein a captured stegatone 410 can be bandpass-filtered at 420 via bandpass filter 430. Low frequencies can be removed as these frequencies are common to all prints and provide unwanted signal in the signature, and the highest frequencies can be removed to reduce imaging noise.

Figure 5:
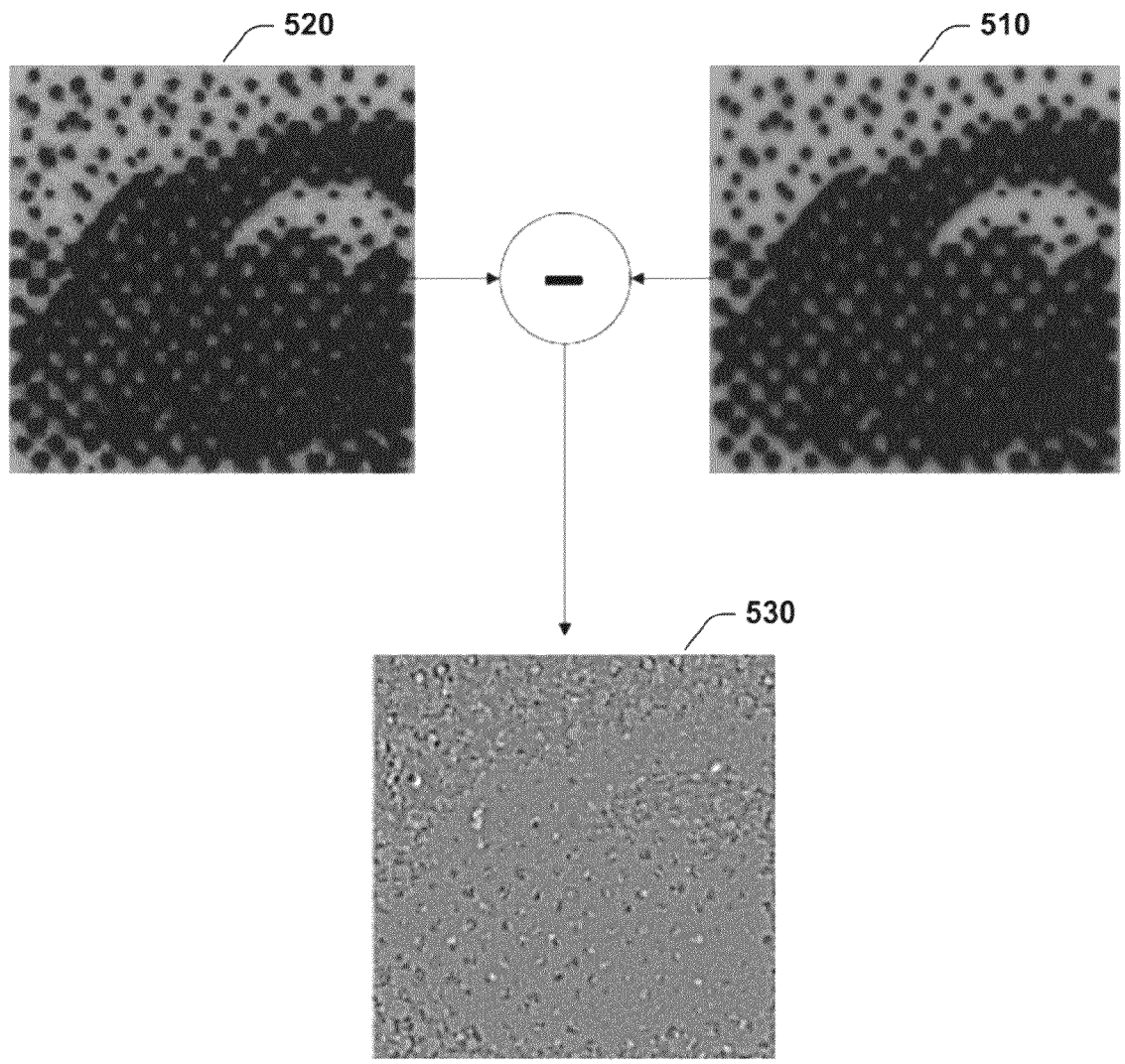
FIG. 5 illustrates an example of difference processing for halftones.

A second preprocessing example is illustrated at FIG. 5. In this example, the digital stegatone can be utilized and is indicated by the lines 270 and 280 in FIG. 2. A model of the printer rendering process can be used to filter the digital stegatone to produce a stegatone model as shown at 510 of FIG. 5. This image can be subtracted from the aligned captured hardcopy at 520 to produce a difference signal image shown at 530.

A task of the subdivide area processor 250 in FIG. 2 can be used to partition the preprocessed image into small sections. One example approach is to segment the image into equispaced blocks. FIG. 6 illustrates an example division into 80×80 blocks but other division patterns are possible. Larger sample sizes can correspond to codes with greater discriminative power, but may require more computation and storage.

Another subdivision approach can be to segment the image along halftone cell boundaries. For the example image 310 of FIG. 3, there are 23×23 halftone cells. This segmentation is shown in FIG. 7. In the case of stegatones, the reference map identifies carrier cells. Carrier cells can have symmetric shapes and provide black-to-white transitions. The number of samples then can be reduced to only measuring carrier cells depicted as grey in FIG. 7. It is noted that these cells can correspond to the carriers as indicated in the reference map 320 of FIG. 3. The cells can be further subdivided into concentric shells as shown at 810 of FIG. 8 to offer a measure of anisotropy where weights are assigned to the shells corresponding to their discriminating value. If the digital stegatone is used as a guide, the carrier cell shift positions are known and the concentric shells could be likewise shifted as is shown at 820 of FIG. 8 for the example case where the shift is to the right. Other shift positions (e.g., up, down, diagonally, to the left) are also possible.

When the image is subdivided with areas selected, the area code generator 254 of FIG. 2 computes a normalized variance in each area. Means to generate this code include computing the variance of each area and from them compute a mean variance that acts as a unit value. The variance of each area can then be normalized by dividing by the mean unit value. Rounding this normalized variance to produce an ordered list of small integer values (one for each area) completes the area coding scheme. This code can be stored in the print signature registry 260. The data payload 212 can be extracted from the stegatone and can be used to provide a reference into this registry. This can both improve efficiency of subsequent code comparison and improve robustness as a one-to-one comparison can be more robust than a one-to-many search for the closest match, for example.

Figure 9:
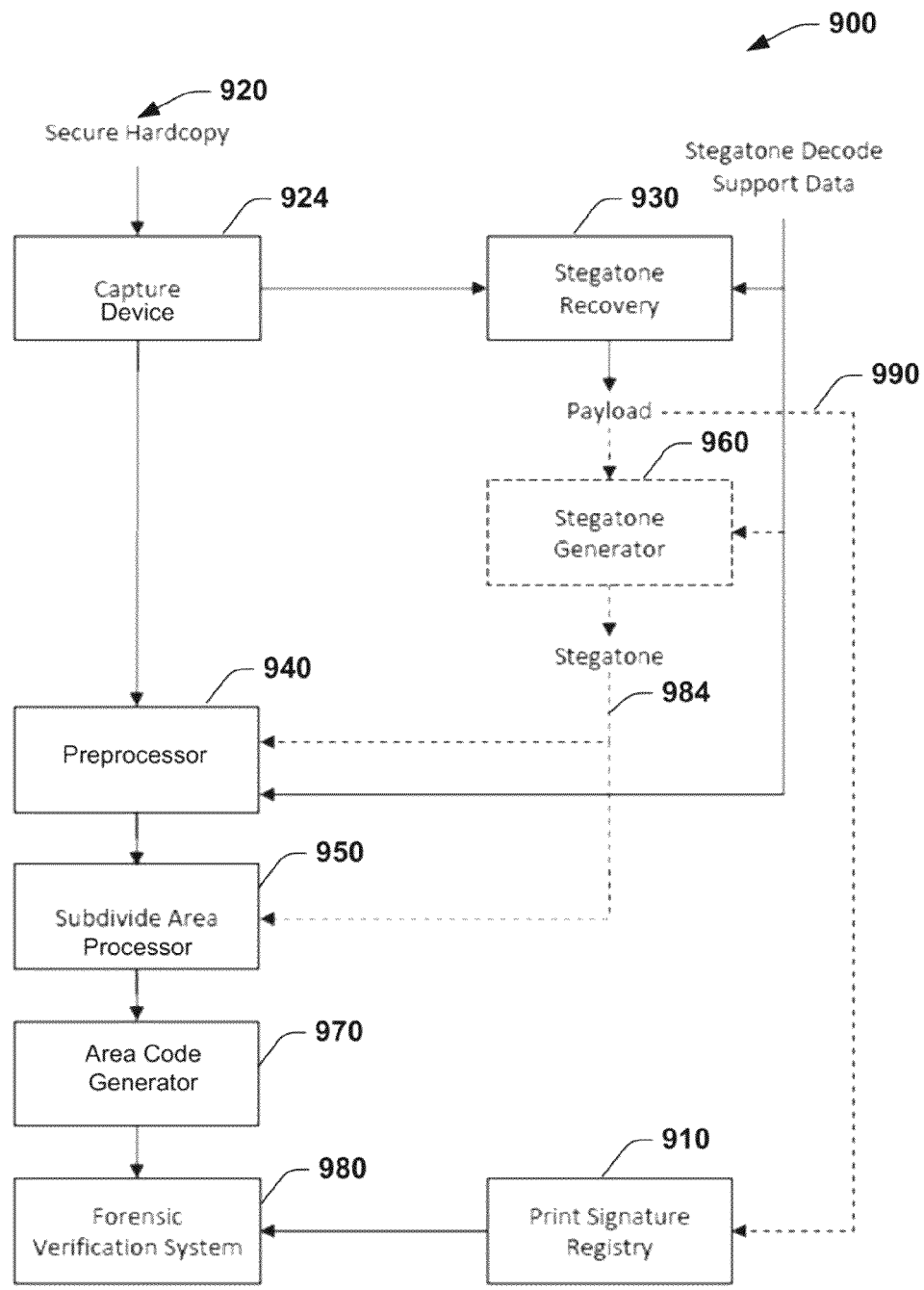
FIG. 9 illustrates an example of decoding and forensic verification system utilizing forensic markings inside halftones.

FIG. 9 illustrates an example of a forensic verification decoding system 900 for analyzing reference signatures and print signatures from interiors of halftones. A function of the system 900 is to recover a payload from a stegatone (or halftone if stegatone not used), use the recovered payload to index a print signature registry 910 and verify that the print signature of the captured stegatone is consistent with the reference print signature version stored in the registry.

Given a secure hardcopy document 920, a capture device 924—similar to what was used in the capture stage of the encoding system of FIG. 2, is used to create a digitized version of the document. This can be passed to a stegatone recovery system 930, along with the stegatone decode support data as generated by the encoding system depicted in FIG. 2. One aspect to recovering the payload is alignment of the captured image. This implies that the boundaries of each halftone cell are known. Since the digital stegatone will not yet be available, the reference halftone (314 of FIG. 3) can be used to align the captured image. The cell shifts can then be located and the payload recovered. Due to possible imperfection in the print-capture process, errors can occur. For this reason error correction codes can be used. Aspects of the procedure of interpreting the payload can beanalogous to the procedure of reading digital information from other physical media, such as CDs, or some types of disks since the processes that perform measurements to determine the represented bits are typically not error-free, the data should be protected with error correction codes. In the case of stegatones, data can be represented by tiny shifts in sub-elements (e.g., a subset of pixels) of a printed dot cluster. Scratches or folds can make interpretation of the shift ambiguous. Even without physical degradations of the document, nonlinearities in the printer or capture device can distort alignment which in term can result in errors in data recovery. Error correction coding can utilize redundancy in a strategic manner to detect and correct such errors.

Recovery of the forensic signature can operate in a symmetrical manner to that used in the encoding system of FIG. 3. When the digital stegatone is needed for a preprocessor or subdivide area processor 950, it can be regenerated from the recovered payload via a stegatone generator 960. Alternatively, the original stegatone can be fetched from a library (e.g., print signature registry 910) and indexed by all or part of the payload. When an area code is established via an area code generator 970, a forensic verification system 980 can validate it against a reference version stored in the print signature registry 910. The reference signature can be efficiently located by using all or part of the payload as an index into the registry 910, for example. Dashed line at 960, 984, and 990 represent alternative example paths depending on whether a stegatone is employed or a halftone is utilized in the encoding/decoding process.

Figure 10:
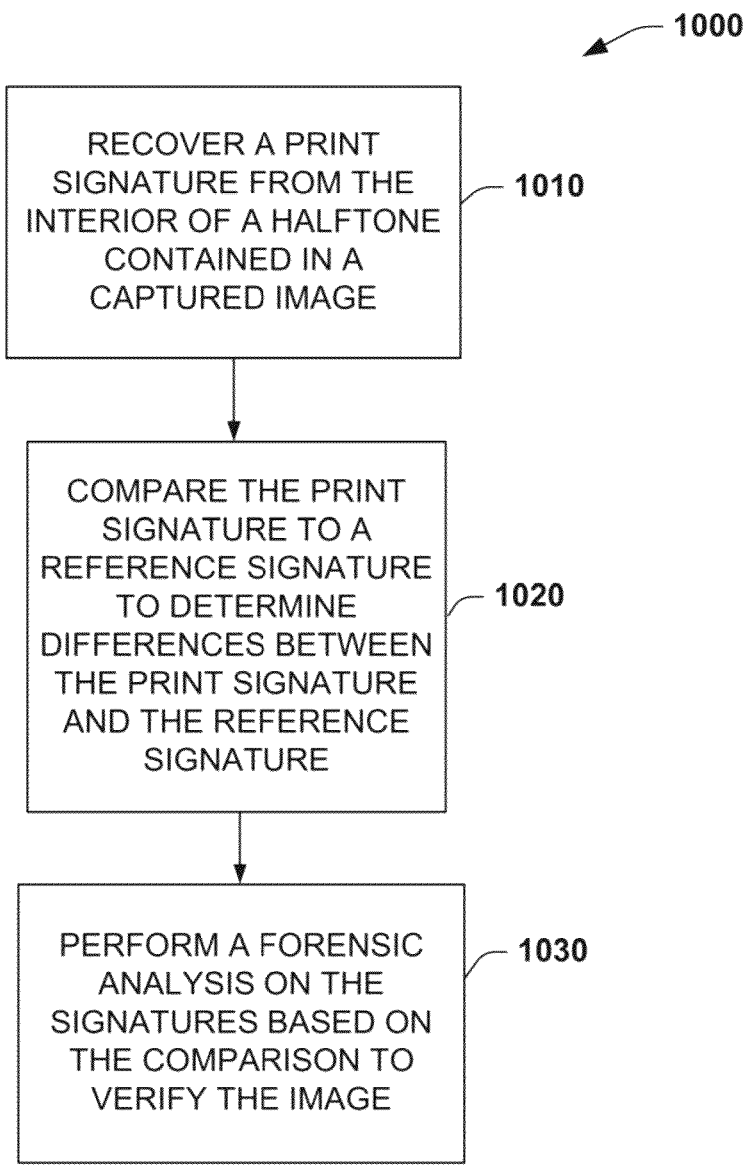
FIG. 10 illustrates an example method for performing forensic verification of printed documents utilizing forensic markings inside halftones.

In view of the foregoing structural and functional features described above, an example method will be better appreciated with reference to FIG. 10. While, for purposes of simplicity of explanation, the method is shown and described as executing serially, it is to be understood and appreciated that the method is not limited by the illustrated order, as parts of the method could occur in different orders and/or concurrently from that shown and described herein. Such a method can be executed by a processor and associated equipment, for example.

FIG. 10 illustrates an example method 1000 for performing forensic verification of printed media utilizing halftone to generate and analyze print signatures. The method 1000 includes recovering a print signature from the interior of a halftone contained in a captured image at 1010 (e.g., via print signature extractor 1110 of FIG. 11). At 1020, the method 1000 includes comparing the print signature to a reference signature to determine differences between the print signature and the reference signature (e.g., via comparator 1120 of FIG. 11). At 1030, the method 1000 includes performing a forensic analysis on the signatures based on the comparison to verify the image (e.g., via forensic analyzer 1130 of FIG. 11). Other aspects of the method 1000, although not shown, can include encoding payload information into the halftone to form a stegatone. This can include performing bandpass filtering or digital subtraction on the stegatone to facilitate further image analysis. This can also include subdividing the stegatone to mitigate computing and storage requirements.

Figure 11:
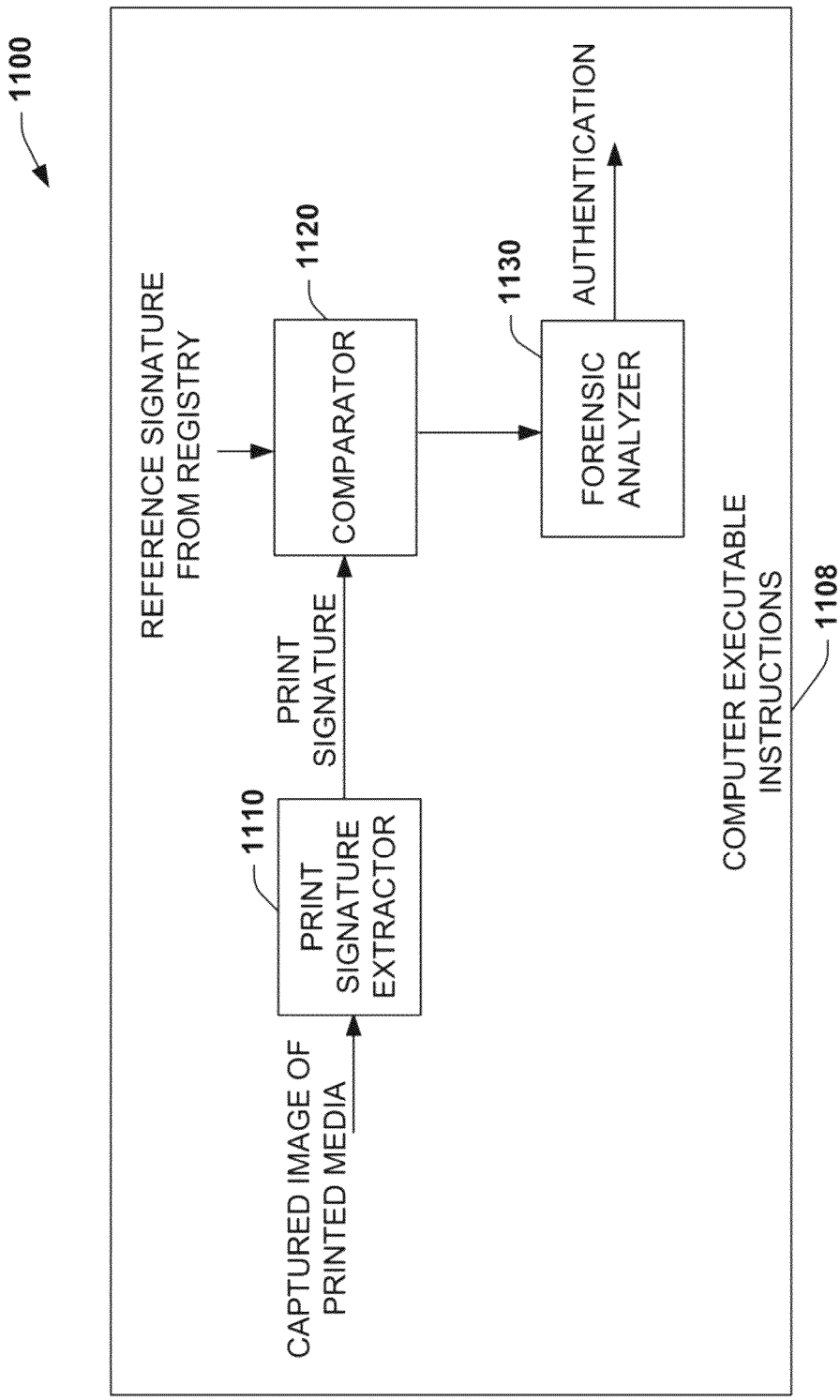
FIG. 11 illustrates an example of a forensic analysis system.

FIG. 11 illustrates an example of a forensic analysis system 1100. The system 1100 includes computer executable instructions 1108 that enable a forensic analysis and verification of printed documents. The system 1100 includes a print signature extractor 1110 to extract a print signature from an interior of a halftone of an image of printed media. A comparator 1120 compares the print signature to a reference signature stored in a registry to determine differences between the print signature and the reference signature. A forensic analyzer 1130 performs a forensic-level statistical image analysis on the print signature and the reference signature based on the comparison to authenticate the printed media.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium comprising computer executable instructions that when executed cause a processor to:
   extract an interior of a halftone of an image of printed media, wherein at least a portion of the interior of the halftone is encoded with a print signature;
   authenticate the printed media based on a forensic-level statistical image analysis,
   wherein the forensic-level statistical analysis comprises:
   accessing a reference signature stored in a registry, wherein an interior of the reference signature is encoded with payload information, wherein the payload information is employed to index the print signature;
   comparing the print signature to the payload information to determine differences between the print signature and the payload information; and
   verifying that the printed media is authentic based on the comparison.

2. The non-transitory computer readable medium of claim 1, wherein the halftone is encoded with the payload information to form a stegatone.

3. The non-transitory computer readable medium of claim 1, further comprising a preprocessor to preprocess the halftone via a bandpass filter to mitigate low and high frequencies within a captured image.

4. The non-transitory computer readable medium of claim 3, wherein the preprocessor employs a difference analyzer that subtracts an image from an aligned captured hardcopy to produce a difference signal image.

5. The non-transitory computer readable medium of claim 1, further comprising a subdivide area processor that processes the halftone via an equi-spaced grid to segment the halftone into smaller processing portions to mitigate computing and storage requirements.

6. The non-transitory computer readable medium of claim 5, wherein the subdivide area processor processes the halftone according to concentric regions of an image to mitigate computing and storage requirements.

7. The non-transitory computer readable medium of claim 5, further comprising an area code generator to produce a print signature based on output from the subdivide area processor.

8. The non-transitory computer readable medium of claim 7, wherein the area code generator determines a normalized variance for each processing portion generated by the subdivide area processor.

9. A non-transitory computer readable medium comprising computer executable instructions that when executed cause a processor to:
   extract a print signature from an interior of a halftone of an image of printed media, wherein the halftone is encoded with payload information;
   compare the print signature to a reference signature stored in a registry to determine differences between the print signature and the reference signature; and
   perform a forensic-level statistical image analysis on the print signature and the reference signature based on the comparison to authenticate the printed media,
   wherein the halftone is generated with a unique payload to form a one-to-one mapping between the print signature and the payload information.

10. A non-transitory computer readable medium comprising computer executable instructions that when executed cause a processor to:
    extract a print signature from an interior of a halftone of an image of printed media, wherein the halftone is encoded with payload information;
    compare the print signature to a reference signature stored in a registry to determine differences between the print signature and the reference signature; and perform a forensic-level statistical image analysis on the print signature and the reference signature based on the comparison to authenticate the printed media, wherein the halftone is generated with a common payload to form a many-to-one mapping between the print signature and the payload information.

11. A method, comprising:

recovering a print signature from an interior of a halftone of a captured image of printed media, wherein the halftone is encoded with the print signature;

accessing a reference signature stored in a registry, wherein an interior of the reference signature is encoded with payload information, wherein the payload information is employed to index the print signature;

comparing the print signature to the payload information to determine differences between the print signature and the payload information; and verifying that the printed media is authentic based on the comparison.

12. The method of claim 11, wherein the halftone is encoded with the payload information to form a stegatone, further comprising performing bandpass filtering or digital subtraction on the stegatone to facilitate further image analysis.

13. The method of claim 12, further comprising subdividing the halftone to mitigate computing and storage requirements.

14. A system comprising:

a memory for storing computer executable instructions; and a processing unit for accessing the memory and executing the computer executable instructions, the computer executable instructions comprising:

a preprocessor to generate a filtered signal or a difference signal from a captured image of printed media;

a subdivide area processor to segment the filtered signal or the difference signal in preparation of further image processing of the captured image of printed media;

an area code generator to process segmented output from the subdivide area processor and to recover a print signature from an interior of a halftone that is encoded with payload information; and a forensic verification system to authenticate the printed media by comparing the recovered print signature with a reference signature stored in a print signature registry, wherein the reference signature comprises payload information that is employed to index the print signature and comprises a unique payload to form a one-to-one mapping between the print signature and the payload information or a common payload to form a many-to-one mapping between the print signature and the payload information.

* * * * *